Feb. 27, 1962   H. L. DOBRIKIN   3,023,031
IDENTICAL REINFORCED HALF COUPLINGS FOR HOSE
Filed Aug. 28, 1958
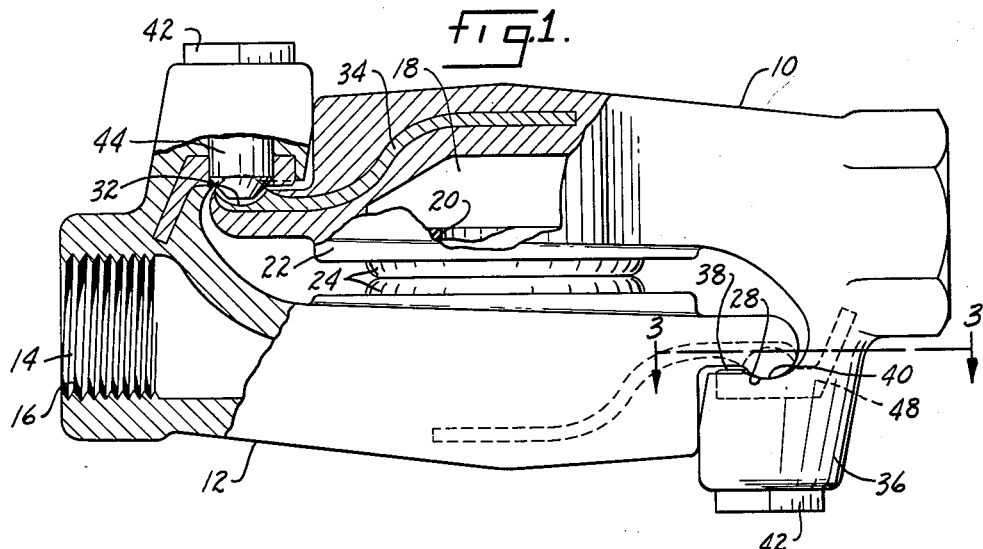
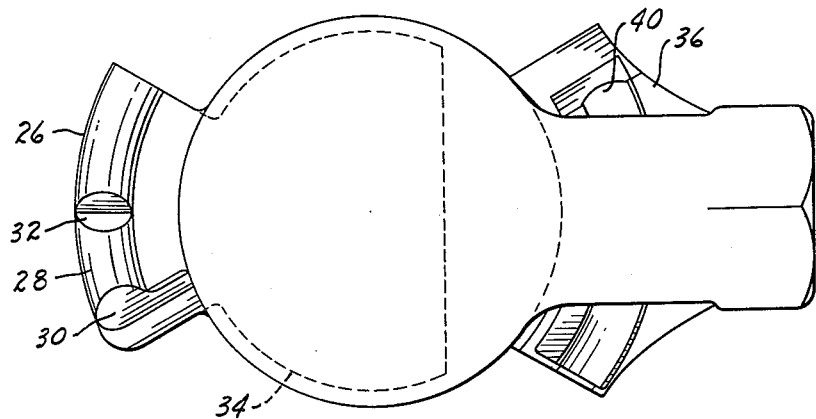
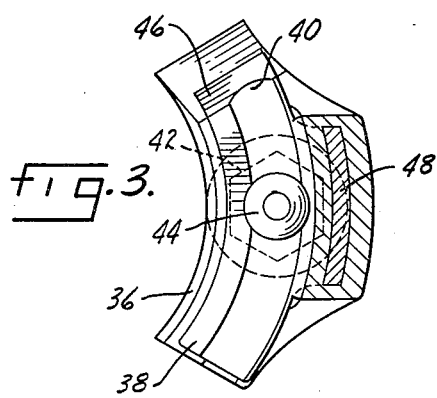
INVENTOR.
Harold L. Dobrikin,
BY Parker & Carter
Attorneys.

United States Patent Office 3,023,031
Patented Feb. 27, 1962

3,023,031
IDENTICAL REINFORCED HALF COUPLINGS
FOR HOSE
Harold L. Dobrikin, Chicago, Ill., assignor to Berg Airlectro Products Co., Chicago, Ill., a corporation of Illinois
Filed Aug. 28, 1958, Ser. No. 757,744
2 Claims. (Cl. 285—69)

This invention relates to air hose coupling structures for large motor trucks and more particularly to wearing and reinforcing members used therein.

A primary purpose of the invention is an air hose coupling structure or glad hand composed of two main coupling members adapted to be rotated into a locking position, which coupling members can each have a pair of wearing faces adapted to engage the opposite wearing face of the other coupling member. Each of said wearing faces being formed by a wearing member made from a material harder than the material forming the main coupling members.

Another purpose is an air hose coupling structure or glad hand as described above, wherein the wearing members may extend into the main coupling members and form a reinforcing means therefor.

Another purpose is an air hose coupling structure or glad hand wherein the coupling members have their locking parts made from a strong hard material which will not wear away and accidently cause the coupling to be unlocked.

Another purpose is an air hose coupling structure for use with large motor trucks which is strong and durable and able to withstand the many shocks and vibrations caused by highway travel.

Another purpose is an air hose coupling structure for use with large motor trucks which can be easily rotated into locking position, and once in said position will not be released therefrom by the excessive jars and shocks caused by the travel of the truck on the highway.

Other purposes will appear in the ensuing specification and drawings wherein:

FIGURE 1 is a partially cut away side view of an air hose coupling structure,

FIGURE 2 is a top view of a coupling member used in my air hose coupling structure, and FIGURE 3 is a view taken along the line 3—3 of FIGURE 1.

Referring now to the drawings wherein like parts are indicated by like numbers, a pair of identical main coupling members are indicated at 10 and 12. Each of said coupling members has a port 14 at one end, the ports being diametrically opposed when the coupling members are assembled as in FIGURE 1. The ports may be threaded as at 16, so that an air hose may be coupled thereto.

The inside of each of the coupling members may be hollow, as at 18, to form an air chamber which is in communication with the port 14. The air chamber 18 is also in communication with an aperture 20 which completes the air passage through the coupling member. The outside of the coupling member adjacent the aperture 20 has been outwardly extended, as at 22, to form a seat for a gasket or similar sealing means 24. When the coupling is assembled as in FIGURE 1, the gaskets 24 are pressed tightly together and form an airtight seal between the coupling members 10 and 12. An air passage through the hose coupling is then formed by the ports 14, the chambers 18, and the generally aligned apertures 20.

Extending outwardly from the end of the coupling member opposite the port 14 is an arcuate flange member 26 which has a generally curved protrusion or bead 28 extending outwardly therefrom so as to form a wearing surface for the coupling member. The bead 28, one end of which is chamfered or tapered as at 30 to form a smooth engaging surface, may have a generally central slot 32.

In the preferred form the bead or protrusion 28 may be constructed of a material which has a greater hardness than the material forming the coupling member, so that the wearing surface formed by the bead is hard, smooth and durable. The plate or wearing member which forms this hard wearing surface may be extended into the interior of the coupling member as at 34 to give added strength to the coupling member. In the invention as shown in the drawings the plate or reinforcing member 34 extends almost one-half of the length of the coupling member and provides substantial reinforcement therefor.

Extending outward from the coupling member and adjacent the port 14 is a second arcuate flange member 36. The side of the flange 36 disposed towards the coupling member has a wearing surface indicated at 38 which may be grooved as at 40. The flange 36 may have a screw, stud or similar means 42 extending through the center of the flange and projecting into the groove, as at 44, to form a locking pin to secure the two coupling members against relative rotation when the coupling is assembled. The projection or locking pin 44 is adapted to be received by the slot 32 when the coupling is assembled. One end of the flange 36 has been chamfered or tapered as at 46 to form a smooth engaging surface which is complementary with the engaging surface 30 of the first flange.

In the preferred form the wearing surface 38 is constructed of a material harder than the material forming the coupling member and provides a hard, smooth, and durable wearing surface. The wearing surface 38 may be formed from a plate or wearing member 48 which extends into the coupling member and acts as a reinforcement therefor.

The use, operation and function of the invention is as follows:

An air hose coupling structure or glad hand, such as described herein, is normally used in an air brake system of a large motor truck or semi-trailer. In normal usage the tractor and trailer are subjected to severe jolts and shocks, so that in order for the brake system of such a truck to remain operative and functional at all times, the air hose coupling between the tractor and the trailer must be strong and durable.

During normal operation the trailer and tractor will be uncoupled and coupled numerous times, therefore the hose coupling which couples the air brake system of the tractor to the trailer, should have its locking parts strong and wear resistant. Accordingly, a hose coupling constructed in accordance with the invention, has the wearing surfaces or wearing parts formed from a material which is harder than the material of which the coupling itself is constructed. This will allow the coupling to be uncoupled and coupled numerous times without wearing away the edges of the projections 44, and the slots 32 which form the locking means for the coupling. If the sides of the projections or the slots were to wear away the coupling could inadvertently be unlocked during normal operation of the truck, causing the brake system to fail, which in turn could cause an accident.

It has also been found that during normal operation the hose coupling is subjected to severe strains and shocks which would break or bend the coupling members. Accordingly another advantage of a hose coupling constructed in accordance with this invention is that the coupling members are reinforced by the wearing plates extending into the coupling members.

Best results have been obtained when the coupling members are made from a cast metal and the wearing plates are made of a hard steel material, the coupling member usually being die-cast.

In order to assemble an air brake hose coupling or glad hand constructed in accordance with the invention, the two identical coupling members are first positioned one above the other so that the ports 14 are generally at right angles to each other, and the gaskets 22 and apertures 20 are generally aligned. Either one or both of the coupling members may then be rotated until the first or outwardly extending flanges 26 with engaging surfaces 30 contact the second or outwardly projecting flanges 36 with engaging surfaces 46. As the engaging surfaces meet the outwardly extending flanges 26 will be forced inward and the gaskets or other sealing means will be compressed together to form an air tight passage between the two coupling members. The rotation of the two coupling members is continued until the projections 44 are received into the slots 32, at which point the flanges will be firmly locked against relative rotation of the two coupling members. The coupling is now secured against relative rotation and an airtight passage has been completed between the ports 14.

The coupling members have been shown as having the wear plates 34 extending into the coupling member almost half the length of the coupling member, but the invention is not limited to a wear plate of this particular length, as the wearing plate may extend a greater or lesser distance without departing from the scope of the invention. Also the invention has been described as having the slots 32 and the projection 44 generally centrally located on the projecting flanges, again the invention is not limited to this structure as the particular location of the slot and projection is not essential except that the projection and slot should be generally aligned when the hose coupling is assembled. With these and other modifications, alterations or substitutions in mind, I only wish to be limited by the following claims.

I claim:

1. A hose coupling for use with an air brake system or the like including a pair of oppositely disposed main coupling members each including a chamber therein, a port and an aperture each in communication with said chamber, a sealing means circumscribing each of said apertures, said main coupling members adapted for assembly whereby an air passage is formed between said ports, a first and second arcuate flange connected to respective main coupling members by a neck portion having a cross section of considerably less thickness than that of the said respective coupling member and extending from opposite ends of each main coupling member, each of the first and second flanges having a wearing face thereon formed by a wearing member made of a material harder and of greater tensile strength than the material forming the main coupling member, each of said wearing members extending through the neck portion into and being embedded within the main coupling members and forming a reinforcement therefor, said wearing members associated with said first flanges extending a substantial distance into a corresponding member, each of said first flanges wearing faces having a protrusion extending therefrom, a notch in each of said protrusions, each of said second flanges having a recession therein which receives said protrusion, a projection extending from said recessions, each of said notches being adapted to receive a projection when the two main coupling members are assembled into an air hose coupling.

2. A coupling element adapted to mate, in opposed relation, with an identical coupling element to provide a coupling for use with the hose line of an air brake system, said coupling element having a chamber therein, said coupling member being provided with a port and an aperture each in communication with said chamber, a sealing means circumscribing the aperture, a first and second arcuate flange each connected to said coupling element by a neck portion having a cross section considerably less in thickness than that of the said coupling element, said neck portions extending from opposite ends of said coupling element, each of said flanges having an exposed wearing face thereon formed by a reinforcement member made of a material harder and of greater tensile strength than the material forming the coupling elements, each of said reinforcement members extending through the associated neck portions of the respective flanges into and being embedded within the coupling element and forming a reinforcement therefor, said reinforcement member associated with said first flange extending a substantial distance into said coupling element, said reinforcement member having a protrusion extending from said first flange, a slot in said protrusion, the second said flange having a recession, a projection extending from said recession, said slot and said projection of the coupling element being positioned thereon to cooperatively engage a corresponding projection and slot respectively of an identical coupling element when coupled thereto in opposed relation with the apertures of the respective coupling elements aligned to provide a continuous air passage between said ports.

References Cited in the file of this patent

UNITED STATES PATENTS

| | | |
|---|---|---|
| 961,699 | Jewett | June 14, 1910 |
| 1,254,302 | Bell et al. | Jan. 22, 1918 |
| 1,619,464 | Eichorn | Mar. 1, 1927 |
| 2,230,116 | Kreidel | Jan. 28, 1941 |
| 2,416,618 | Ferla | Feb. 25, 1947 |
| 2,431,694 | Johnson | Dec. 2, 1947 |
| 2,496,167 | Knox | Jan. 31, 1950 |
| 2,695,184 | Hobbs | Nov. 23, 1954 |
| 2,845,311 | Cobb | July 29, 1958 |